(12) United States Patent
Boyd

(10) Patent No.: US 8,582,976 B2
(45) Date of Patent: Nov. 12, 2013

(54) TRANSMISSION OF BROADBAND SIGNALS

(75) Inventor: Ivan Boyd, Ipswich Suffolk (GB)

(73) Assignee: British Telecommunications Public Limited Company, London (GB)

(*) Notice: Subject to any disclaimer, the term of this patent is extended or adjusted under 35 U.S.C. 154(b) by 543 days.

(21) Appl. No.: 12/681,451

(22) PCT Filed: Oct. 3, 2008

(86) PCT No.: PCT/GB2008/003365
§ 371 (c)(1),
(2), (4) Date: Oct. 20, 2010

(87) PCT Pub. No.: WO2009/044164
PCT Pub. Date: Apr. 9, 2009

(65) Prior Publication Data
US 2011/0026934 A1  Feb. 3, 2011

(30) Foreign Application Priority Data
Oct. 3, 2007  (EP) .................................. 07253910

(51) Int. Cl.
*H04B 10/2507* (2013.01)

(52) U.S. Cl.
USPC .......................................... 398/158; 398/147

(58) Field of Classification Search
USPC .................................... 398/158, 147
See application file for complete search history.

(56) References Cited

U.S. PATENT DOCUMENTS

| | | | |
|---|---|---|---|
| 6,204,945 B1 * | 3/2001 | Iwata et al. .................... 398/9 |
| 2002/0031113 A1 | 3/2002 | Dodds et al. | |
| 2004/0086274 A1 | 5/2004 | Wan et al. | |

FOREIGN PATENT DOCUMENTS

GB  2383919 A  7/2003

* cited by examiner

*Primary Examiner* — Leslie Pascal
(74) *Attorney, Agent, or Firm* — Patterson Thuente Pedersen, P.A.

(57) ABSTRACT

The invention is concerned with the transmission of broadband signals onto to a telephony connection having constraint profile limiting the maximum allowed power as a function of frequency. As a result, broadband signals can be delivered using low power equipment to a telephony line whilst respecting the constraint profile associated with that line.

17 Claims, 5 Drawing Sheets

TRANSMISSION OF BROADBAND SIGNALS

CROSS-REFERENCE TO RELATED APPLICATIONS

This application is a U.S. national stage application of International Application No. PCT/GB2008/003365, filed Oct. 3, 2008, which designated the U.S. and claims the benefit of European Patent Application No. 07253910.9, filed Oct. 3, 2007, both of which are incorporated herein by reference in their entireties.

TECHNICAL FIELD

The present invention is concerned with the transmission of broadband signals onto to a telephony connection, in particular in situations in which the signal levels that can be transmitted over the telephony connection are limited as a function of frequency by a constraint profile.

BACKGROUND

In recent years, particularly with increasing use of the internet, there has been an interest in providing higher data rates to users. One objective of developments in this area, in countries with a heavy historical investment on copper access networks, has been to make use of existing twisted-pair telephone lines. A result of this has been the Asymmetrical Digital Subscriber Line (ADSL) approach in which it was found that an existing copper pair from a telephone exchange or central office to a telephone subscriber's premises could, using suitable modulation techniques, support significant downstream data rates, of the order of 1.5 Mbit/s. However the actual rate obtained in practice depends on the quality and length of the path from the exchange. An alternative proposal, providing higher data rates, is to make use of the copper pair only from some point rather closer to the user, normally from the intermediate node or cabinet connected to the exchange by an optical link. This is sometimes referred to as a "fibre to the cabinet" arrangement, and is used with very high speed Digital Subscriber Line (VDSL) technology or other Digital Subscriber Line technologies, which are generally referred to as "xDSL". xDSL signals, produced using xDSL modulation (rather than SDH or ATM techniques) are referred to herein as "broadband signals" and are discussed further in appendix 1.

In one type of "fibre to the cabinet" arrangement, a broadband service is provided from the exchange by a multiplexer/demultiplexer which multiplexes signals, using ATM or SDH techniques, onto one or more optical fibres that feed the cabinet. Within the cabinet there is provided (for each fibre) an ATM or SDH demultiplexer, and at least one DSL access multiplexer (DSLAM) for providing, on the basis of the demultiplexed ATM or SDH signals, broadband signals suitable for travelling over the copper pairs, which ultimately lead to the subscriber premises. The or each xDSL modem is connected via filters to the copper pairs so that the broadband signals can be carried over a different frequency range to that of the telephony signals, without the telephony signals and the broadband signals affecting one another. A power supply is normally provided in the cabinet to supply power to the various optical/electrical components.

Because of cross talk and other undesirable effects, is necessary to tailor the power spectrum of broadband signals to the characteristics of the particular line which is to carry them. Each line has a constraint profile associated therewith (know empirically from tests on the line), specifying the maximum allowed power at each frequency. Typically, a constraint profile will have at least one spectral region in which the allowed spectral power is diminished relative to adjacent regions.

It has been suggested to provide xDSL modulator equipment at the exchange or other location feeding the exchange, such that the xDSL-modulated signals can be transmitted from the exchange over an optical extension link to the cabinet before being launched onto a telephone line. However, the transmission over the link introduces noise. This noise can be particularly troublesome in the spectral region(s) where the broadband signal is low as a result of the restrictions on the maximum allowed power imposed by the constraint profile of the relevant line.

SUMMARY

According to embodiments of the invention, there is provided a method of delivering broadband signals over an optical link for subsequent transport over a telephony connection, the telephony connection having a constraint profile associated therewith according to which a maximum allowed power of transmitted signals is specified as a function of frequency, the constraint profile having a first spectral region and a second spectral region, the specified power level in the second spectral region being, at least on average, lower than that in the first spectral region, the method including: (i) performing pre-emphasis on the broadband signals such that the amplitude of the signals in the second region is increased relative to that in the first region, thereby causing the level of at least some of the signals to exceed that specified by the constraint profile; (ii) subsequently transmitting the signals over the optical link; (iii) performing de-emphasis on the broadband signals after the signals have been transmitted over the link so as to reverse the previously performed pre-emphasis and return the signals to levels within those specified by the constraint profile; and, (iv) after de-emphasis has been performed, launching the broadband signals onto the telephony connection.

Because the broadband signals are returned to the levels within those specified by the constraint profile, the broadband signal can be more safely transmitted over the telephony connection.

In one embodiment the broadband signal is an analogue-like signal and is subjected to an analogue-to-digital conversion process for transmission over the link, before being converted back into an analogue signal by a digital-to-analogue conversion process. To reduce power dissipation when performing the digital-to-analogue conversion, the analogue-to-digital conversion process is a low resolution process having $10^{12}$ levels or less in an embodiment. Although this introduces significant noise, the pre-emphasis, which is performed before the noise is introduced, improves the signal to noise ratio. Since de-emphasis is performed on the broadband signal with the noise therein, the signal to noise ratio is preserved in the pre-emphasis band, that is, in the second spectral region.

In an embodiment, there is provided a communication system for delivering broadband signals to a telephony connection such that the broadband signals can subsequently be transmitted over the telephony connection, including: a modulator arrangement for modulating signals such that the modulated signals are broadband signals suitable for transmission over the telephony connection, the modulator arrangement having a memory associated therewith which stores in use a constraint profile specifying the maximum allowed power level of signals as a function of frequency, the constraint profile having a first spectral region and a second spectral region, the specified power level in the second spectral region being, at least on average, lower than that in the first spectral region, the modulator stage being arranged to shape the broadband signals in the frequency domain so that the signals are within the power level specified by the constraint profile; a pre-emphasis stage arranged in use to receive the broadband signals and perform pre-emphasis on the broadband signals such that the amplitude of the signals in the second region is increased relative to that in the first region, thereby causing the level of at least some of the signals to exceed that specified by the constraint profile; and, a de-emphasis stage arranged in use to reverse the pre-emphasis applied to the broadband signal by the pre-emphasis stage, such that the broadband signals are returned to levels within those specified by the constraint profile of the modulator stage.

In an embodiment, there is provided a method of delivering broadband signals over an optical link for subsequent transport over a telephony connection, including: performing pre-emphasis on the broadband signals; converting the broadband signals from the electrical domain into the optical domain; transmitting the converted broadband signals over the optical link; after transmission over an optical link, converting the broadband signals from the optical domain back into the electrical domain; performing de-emphasis on the transmitted broadband signals; and, transmitting the de-emphasised signals onto the telephony connection.

In one embodiment, converting the broadband signals from the electrical domain into the optical domain and converting the broadband signals from the optical domain back into the electrical domain are carried out using a conversion process having a noise level associated therewith in a given spectral region. The pre-emphasis has the effect of increasing the broadband signals relative to the noise floor in the given spectral region in an embodiment, and the de-emphasis has the effect of decreasing the both the broadband signal and the noise level in the given spectral region in an embodiment.

Further aspects of the invention are specified in the appended claims.

BRIEF DESCRIPTION OF THE DRAWINGS

The invention will now be further described, by way of example, with reference to the following drawings in which.

DETAILED DESCRIPTION

Figure 1:
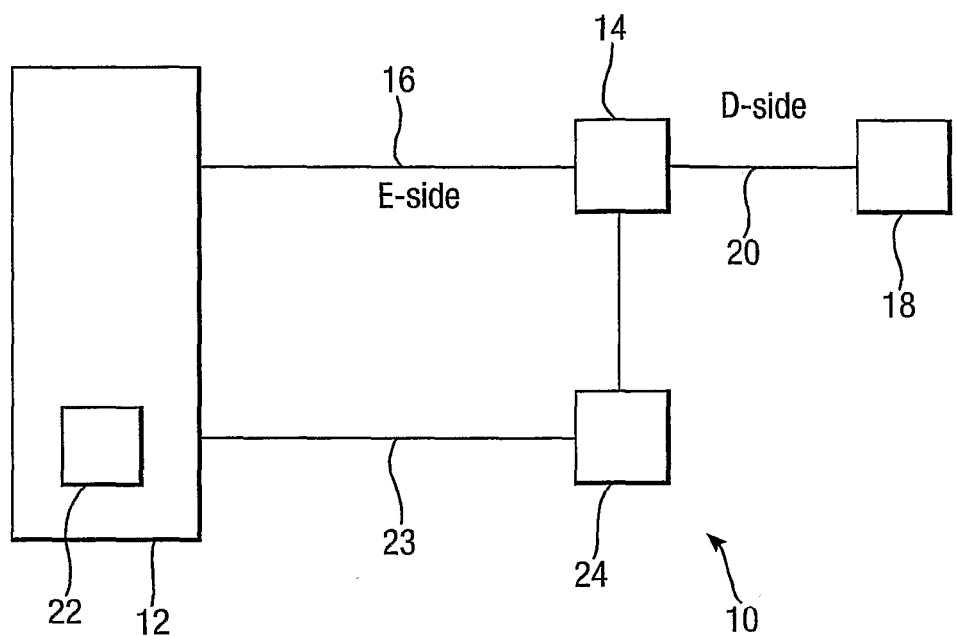
FIG. 1 shows a communications network according to an embodiment.

FIG. 1 shows a telecommunications system 10 in which conventional telephony signals from an exchange 12 are fed to an intermediate node, here a cabinet 14, over an E-side (Exchange-side) electrical connection 16. The telephony signals are then relayed to a customer terminal (such as a telephone system) 18 over a D-side (Distribution-side) electrical connection 20, formed by a twisted pair of electrical conductors, normally from copper conductors. By twisted pair conductors, it is meant a pair of conducting wires, insulated from one another, which cross one another at spaced apart locations along the their length. In practice, the cabinet will be connected to a plurality of terminals 18, each over a respective one of a plurality of twisted pair conductors, although these are not shown for clarity. The E-side and D-side connections are part of a conventional telephony network, the D-side connections ranging in length from a few meters to several kilometers.

In order to provide downstream broadband signals to the customer, the exchange 12 includes a modem equipment in the form of a Digital Subscriber Line Access Modem (DSLAM) 22, hereinafter referred to as a modem, for modulating or otherwise converting SDH-modulated signals from a network input into broadband signals that can be carried by the twisted pair conductors over practical distances, typically over 1 km. The customer terminal also includes a equipment (not shown) for demodulating the downstream signals from the DSLAM, and for modulating upstream signals.

Typically, broadband signals are formed as a plurality of tones, each individually modulated according to Quadrature Amplitude Modulation. The modem is arranged to determine the number and relative amplitude of the transmitted tones by a feedback process, in dependence on the characteristics of the particular line over which the tones are carried. The resulting superposition of tones appears as an analogue signal. Such an arrangement is required because a twisted pair conductor is generally inefficient at carrying high frequency signals, resulting in significant loss and cross-talk with adjacent twisted pair conductors, which may be located in the same conduit.

The broadband signals from the modem are carried by an optical connection, here an optical fibre 23, to an optical node 24, where the signals are then relayed as electrical signals to the cabinet 14 (that is, the signals in the optical domain are converted into the electrical domain by a conversion circuit). At the cabinet, the broadband signals are superposed as electrical signals onto the telephony signals and are transmitted over the E-side twisted pair conductor 20 to the customer terminal 18. Superposition of the telephony and broadband signals is possible because the two signals reside in different frequency ranges, conventional telephony signals having a range of about 400 Hz to 3 kHz, whilst broadband signals typically have a range of 0.1 MHz to 10 MHz.

Figure 2:
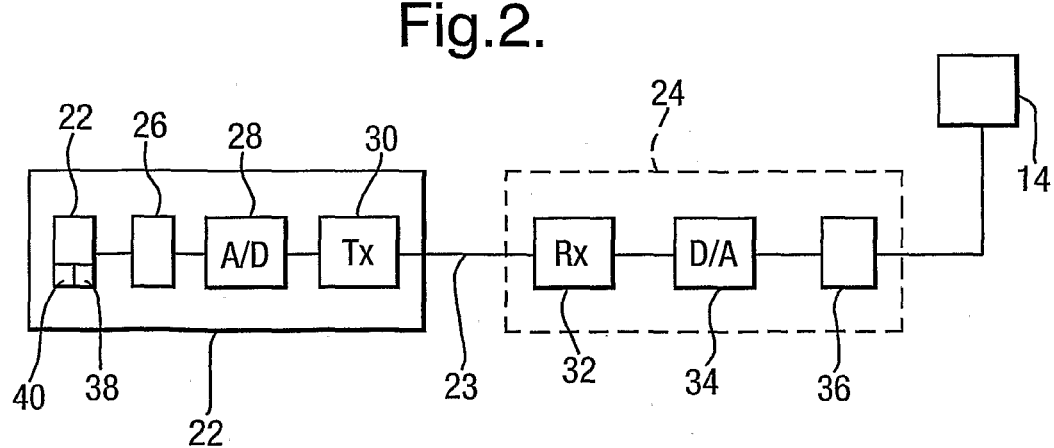
FIG. 2 shows in more detail part of the telecommunications network of FIG. 1.

A more detailed view of the opto-electronic route between the modem 22 and the cabinet 14 is provided in FIG. 2, in which components corresponding to those of FIG. 1 have corresponding numerals. Electrical broadband signals from the modem 22 are passed to a pre-emphasis stage 26 where the electrical signals are subjected to frequency dependent gain, so as to provide shaping of the signals in the frequency domain. The pre-emphasise stage can be described by a frequency dependent gain function G(f), where f is the frequency. Describing the frequency dependence of the amplitude of the broadband signal by a profile function I(f), the effect of the pre-emphasise stage on the broadband signal is to generate a signal whose amplitude-frequency dependence can be described by $T(f)=I(f) \times G(f)$, i.e., the product of I(f) and G(f).

The so-shaped electrical signal, still an analogue signal, is then converted into a binary or other digital signal by an analogue to digital (A/D) converter stage 28, before being converted into the optical domain by a transmission stage 30. The transmitter, A/D converter, pre-emphasise stage, and the modem are each shown as being within the exchange 22, but may be distributed outside the exchange. It is beneficial to transmit the signal along the optical fibre 23 in digital form because the error or noise introduced in the transmission process can more easily and more reliably be predicted than with analogue transmission. This is because even a small non linearity often present in analogue systems would produce harmonics which would interfere with higher frequency tones. The A/D converter has access to encoding and serialisation means to allow the signal to be transmitted in serial fashion over the optical fibre. Likewise, the D/A converter has access to decoding and de-serialisation means in order to properly process the incoming signal.

At the optical node 24, the optical signals are converted back into the electrical domain by a receiver stage 32 and passed to a Digital-Analogue (D/A) converter 34. In the electrical domain the signals are then processed by a de-emphasis stage 36, where the frequency-shaping applied by the pre-emphasise stage 26 is reversed. Mathematically, the D-emphasise stage can be described by a function which is the inverse of G(f), i.e. by a function $R(f)=G^{-1}(f)$. The de-emphasised signal is then passed to the cabinet 14 for transmission over the twisted pair conductor 20.

Each of the pre-emphasis and de-emphasis stages are implemented using respective processor means arranged to execute appropriate signal-processing routines stored on respective memory means.

The pre-emphasise and de-emphasis is carried out in order to address conflicting demands. One of the demands results from the desire to limit the power dissipation at the optical node. This is to reduce the need for environmental control at the optical node, and make it easier to power the optical node using power from the cabinet 14, i.e., using power transmitted over the telephony network (in particular the E-side telephony connection 16). A reduced power consumption is achieved, in part, by using an A/D and D/A conversion scheme that uses only coarse quantisation. For example, in the present embodiment, a quantisation scheme having $2^{10}$ levels is used, although $2^{11}$ or $2^{12}$ levels could be used instead.

To further reduce power dissipation, the sampling rate of the A/D conversion is kept as low as possible. In practice, this means that the sampling rate is twice the frequency of the highest frequency component in the broadband signal: that is, the signal is sampled at the Nyquist frequency, rather than at a higher frequency as is normally done to reduce noise.

Figure 3A:
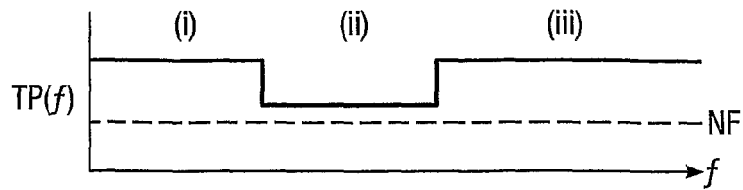
FIG. 3 shows signal profiles at different points in the telecommunications network.

Another demand placed upon the delivery of broadband signals results from the transmission characteristics of the twisted pair connection. Because these are subject to frequency-dependent losses and cross-talk, the maximum power level that can be transmitted across a line is specified as a function of frequency according to a predetermined Cabinet Assigned Loss (CAL) value indicative of the loss associated with the line. Each CAL value has an associated constraint curve, (referred to as an ANFP or Access Network Frequency Plan curve), indicating the maximum allowed transmitted power (TP) at each frequency. That is, the constraint curve provides a constraint on the allowed power level at each frequency. A schematic constraint curve is shown in FIG. 3a. As can be seen from FIG. 3a, the curve has three regions: a first region (i); a second region (ii); and, a third region (iii). The second region, which is between the first and third regions in frequency, is a low power region, the first and third regions being high power regions. That is, the power level of the second region is, at least on average over the frequency range of the second region, lower than the power levels of the first and third regions.

One consequence, however, of using a low-resolution for A/D and D/A conversion is that this introduces a significant noise level into the signal. This noise is shown as a noise floor (NF) in FIG. 3a. Although the noise floor is shown as a perfectly straight line, the noise floor is likely to have some frequency dependence, but this will generally be limited to 50% of its value, at least within the frequency range of the second region, but in one embodiment in the broadband signal range of 0.1 MHz to 10 MHz.

In the high power regions (i) and (iii), the difference between the maximum allowed transmitted power (TP) and the noise floor is large, resulting in a high signal to noise ratio (SNR). However, in the low power region, (ii), the difference between the maximum transmitted power and the noise level is much smaller, resulting in a low SNR.

Figure 3B:
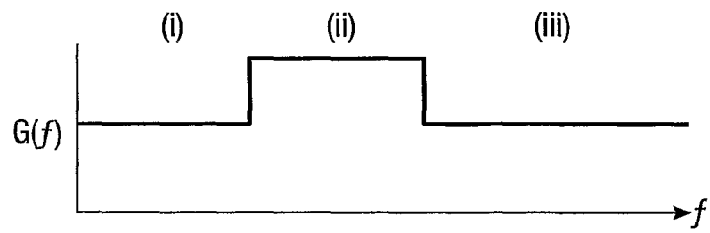
Figure 3C:
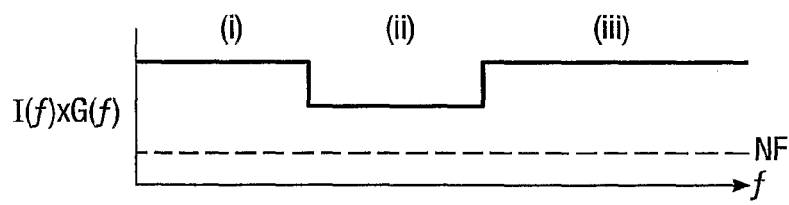

In order to alleviate this problem, the gain function G(f) is shaped so that, broadly speaking, the gain function has a high region in the frequency range corresponding to the low power region (ii) of the constraint curve and low regions in high power regions of the constraint curve, as illustrated in FIG. 3b. The broadband signal can be viewed as being conceptually divided into a plurality of bands illustrated by the regions (i),(ii) and (iii), the pre-emphasis stage being arranged to apply a different gain (if any) to the different bands. The gain function can be viewed as a gain profile, and the effect of the pre-emphasis stage can be viewed a filter or an amplifier which has a lower gain, if any, in the first and third regions than in the second region. Likewise, the de-emphasis stage can also be viewed as an amplifier or a filter with a frequency-dependent gain profile.

As a result of the pre-emphasis imposed on the broadband signal (as defined by the gain function G(f), the difference between the signal level (amplitude) in the low power region (ii) and the high power regions (i), (iii) is reduced. Importantly, because pre-emphasise is carried out before noise is introduced onto the signal by the A/D and D/A process, the noise floor is unaffected by the pre-emphasise. Hence, the SNR in the low power region (ii) is increased. Conversely, the SNR is reduced in the high power regions of the constraint curve, but this reduction can be tolerated because the SNR was originally high in those regions.

Figure 3D:
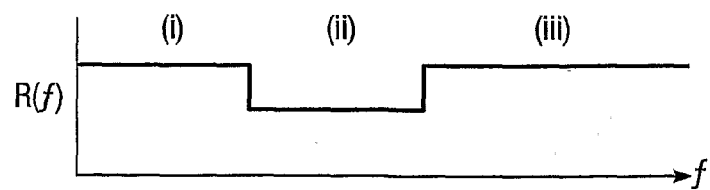
Figure 3E:
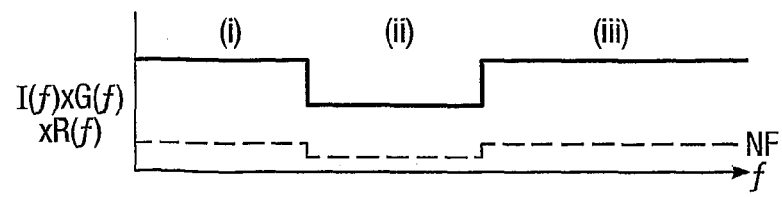

The function R(f) describing the de-emphasis, through which the pre-emphasise is reversed, is shown in FIG. 3d. It can be seen that the function R(f) is a gain profile with a depressed region corresponding in frequency to the increased region (ii) of the pre-emphasise curve of FIG. 3b. The output from the de-emphasis stage is shown in FIG. 3e. Due to the depressed region of the de-emphasis function, the broadband signal is returned to having the constraint profile of FIG. 3a. That is, in the de-emphasis, the signal level is increased further in the high regions (i), (iii) relative to the level in the low region (ii). However, in contrast to the pre-emphasis, the de-emphasise is carried out on both the noise and the signal. The result of this is that the noise floor is no longer flat, but is reduced in the low region (ii) relative to the high regions (i), (iii). Consequently, the improvement in SNR brought about by the pre-emphasise (in the low region (ii)) is retained, even after de-emphasis. The reduction in SNR in the high power regions (i), (iii) is also of course retained, but, as explained above, this is not important because the SNR is already good in those regions.

As a result of pre-emphasise and de-emphasis being carried out in the depressed region of constraint curve, the SNR in the broadband signal can be kept to acceptable levels, in particular in the depressed-frequency region of the constraint curve. Furthermore, the signal level transmitted onto the D-side electrical connection 20 remains within the limits specified by the constraint curve of FIG. 3a, as required by the Access Network Frequency Plan.

Although a single depressed region in the constraint curve is shown, signals with more complicated frequency profiles may need to be transmitted over the D-side connection of FIG. 1. Such signal profiles may have a plurality of depressed regions, in which case the gain function may have a plurality of raised regions, each raised region corresponding in frequency to a respective depressed frequency region of the constraint profile.

In more detail, the pre-emphasis stage is arranged to apply a gain of 5 dB in region (ii), and to apply no gain to regions (i) and (iii). Conversely, the de-emphasis stage is arranged to apply a gain in region (ii) that is 5 dB lower in region (ii) than in regions (i) and (iii). However, different pairs of gain profiles could be used, including ones in which the gain changes smoothly between different regions, provided that for a given pair, the two profiles are complementary to one another: that is, the sum of the two (logarithmic) profiles is substantially frequency independent in the spectral regions of interest. Expressing gain logarithmically, $G(f)=C-R(f)$, where C is a frequency-independent constant equal to zero if we are using Logs.

The gain profile of the pre-emphasis stage (and the complementary gain profile of the de-emphasis stage) is predetermined before the signal from the modem is received, rather than being a function of the instantaneous incoming signal. That is, the difference or differences in the gain applied to different frequency regions is kept constant as a function of time. However, in another embodiment, the pre-emphasis stage may be arrange to dynamically adjust the dynamic range of the signal as a whole, independent of the frequency distribution, in order to avoid clipping at the A/D converter. This is equivalent to the gain profile $G(f)$ of FIG. 3$b$ being appropriately shifted, whilst retaining the shape of the profile such that the difference in gain between the regions (i) and (iii) on the one hand and region (ii) on the other hand is kept constant in time. In practice, this is achieved by monitoring the peak-to-trough ratio of the total signal level (the sum of all the frequency components) and appropriately adjusting the frequency independent gain of the total signal.

The modem is arranged to store at least one constrain curve in a memory 38. However, the modem will normally store a plurality of constraint curves, each associated with a respective CAL value. Input means 40 may be provided to input a CAL value, the modem being arranged to retrieve the appropriate constraint curve for that CAL value. The selected constraint curve will then place a predetermined upper bound on the power that can be transmitted at a given frequency, or more precisely, an upper bound on the power that can be transmitted in an incremental frequency range centred at a given frequency for a range of frequencies.

Figure 4A:
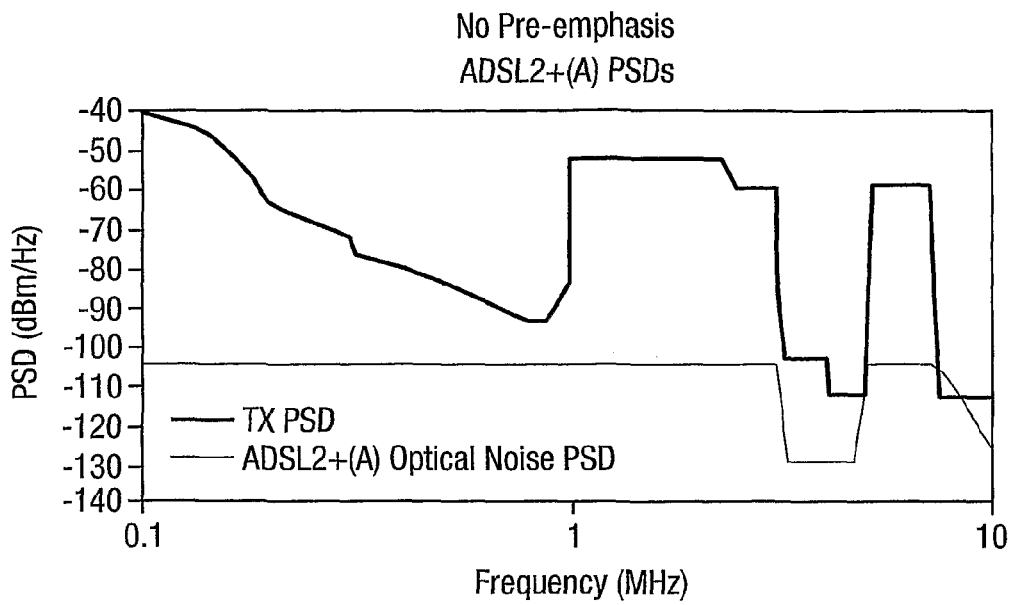
FIGS. 4a and 4b show actual constraint curves (dark lines).
Figure 4B:
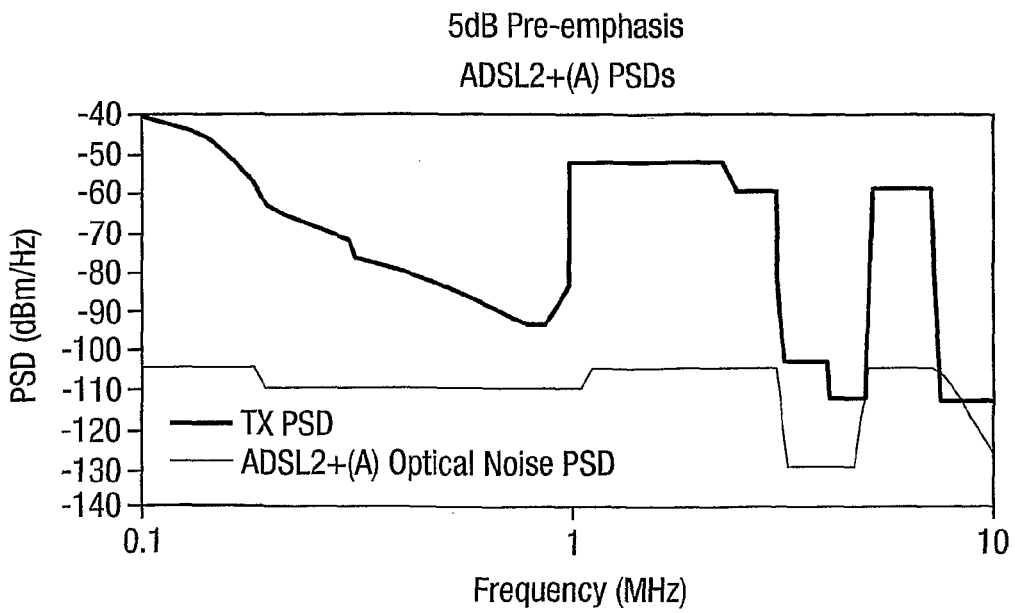
Figure 5A:
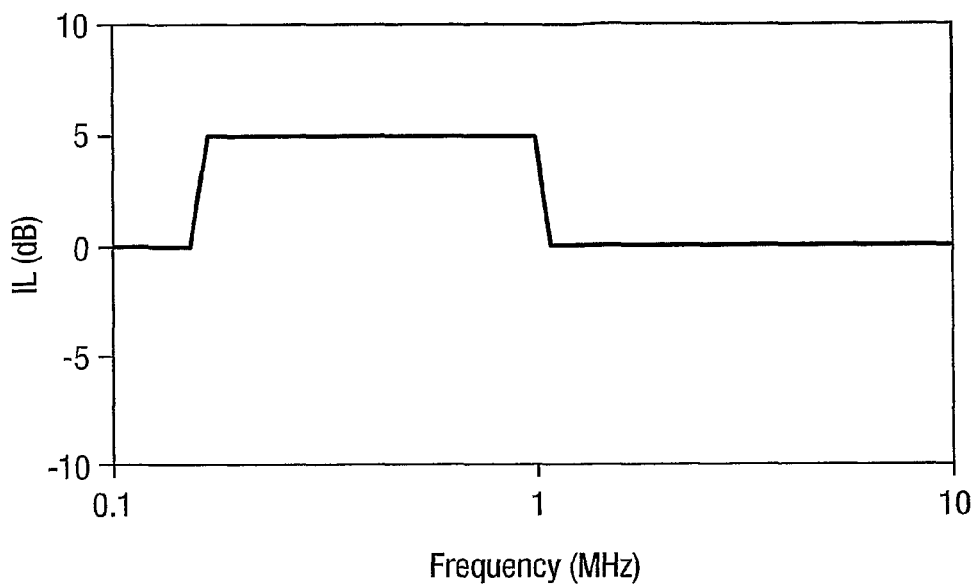
FIGS. 5a and 5b show gain profiles for pre-emphasis and de-emphasis, respectively.
Figure 5B:
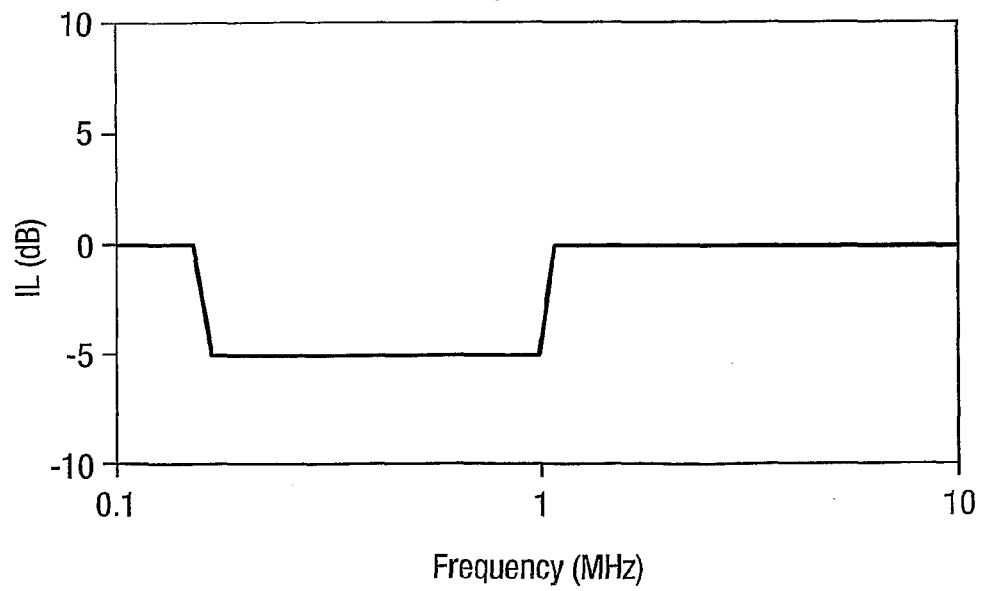

FIGS. 4$a$ and 4$b$ show actual constraint curves (dark lines) for a CAL value of 36dB, without and with pre-emphasis, respectively. Here, the vertical axis is expressed in terms of Power Spectral Density (PSD). As can be seen from the figures, the low power region, corresponding to the region of pre-emphasis between 0.17Mhz and 1Mhz is a region in which the power level is not flat, but reduces continuously. The gain functions for the pre-emphasis and de-emphasis is shown in FIGS. 5$a$ and 5$b$ respectively. Clearly, the result of the pre-emphasis gain will be to increase signals at the level of the constraint curve to a level in excess of the constraint curve. Although the regions of pre-emphasis and de-emphasis are well defined, the low power region in the constraint curve (corresponding to region (ii) of FIG. 3) does not have a well defined boundary itself. Nevertheless, the region (ii) can be defined in this example in terms of the pre-emphasis region itself, i.e., between 0.17mHz and 1Mhz. The neighbouring regions immediately outside the 0.17mHz and 1Mhz pre-emphasis band are clearly of higher power than the power level at any point within the band. Clearly, the third region only extends to about 3 MHz. Beyond 3 MHz, the constraint curve has additional structure including a depression for upstream transmission.

The lighter line in the traces of FIGS. 4$a$ and 4$b$ is the simulated noise spectrum, again without and with pre-emphasis respectively. It can be seen that after de-emphasisis, the noise in the band 0.17 mHz and 1 Mhz is reduced relative to that outside the band, thereby increasing the SNR in the band. The noise spectrum also has a depression between about 3 MHz and 5 MHz, due to filtering imposed to reduce the likelihood the noise being subjected to echo. This depression is not, however, a feature of the noise spectrum inherent in the noise generating processes themselves, and the noise spectrum itself is almost flat.

The medium used to carry the signal in digital form need not be an optical fibre: another communication medium could be used instead, such as co-axial cable, or a radio link. Regardless of the link, the transmission process over the link may introduce noise in a given frequency region where the noise cannot easily be tolerated, whilst the so-introduced noise can be tolerated in another frequency region.

The pre-emphasis stage need not be provided as a separate unit to the modem. Although providing a separate pre-emphasis stage allows existing modems with existing constrain curves stored therein to be used, the pre-emphasis could be taken into account within the modem itself. For example, the constraint curve used by a modem could be chosen so as to have the profile of FIG. 3$c$, so that signals output by the modem are already subject to pre-emphasis (with respect to the constraint curve specified by the Access Network Frequency Plan).

Figure 6:
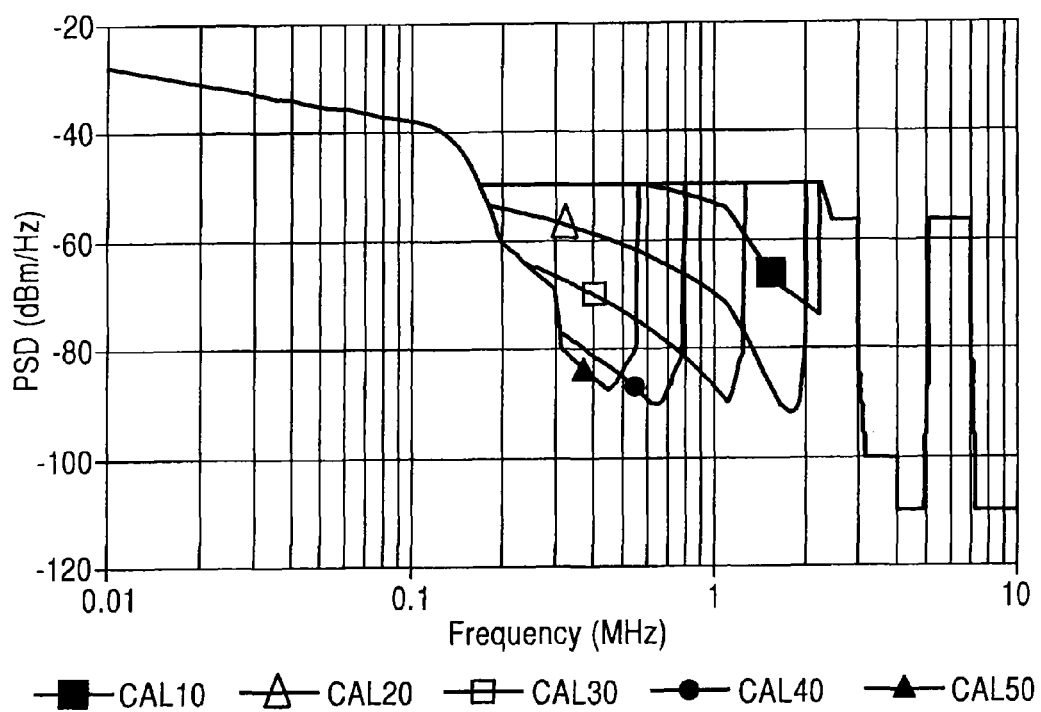
FIG. 6 shows a plurality of constrain curves for respective lines having a different losses associated therewith.

FIG. 6 shows a plurality of constrain curves, each associated with a different level of cabinet assigned loss or CAL. As can be seen, each curve has a dip between 0.2 Mhz and 2 Mhz, the position and extent of the dip being dependent on the CAL value. It has been found that the gain profiles of FIGS. 5$a$ and 5$b$ are suitable for the range of CAL values shown in FIG. 6. Thus, a common gain profile can be used for delivering broadband signals to many different telephone lines, and does not need to be tailored to a given line.

As can be seen from the above description, the embodiments provide a useful way of delivering broadband signals over a telephony connection, such as that provided by the D-side connection of FIG. 1.

Appendix 1

The flowing comments can be made with regard to broadband signals.

There are many types of broadband line code. Whilst international standards bodies currently favour DMT (Discrete Multi Tone), it is still common to find reference to QAM (Quadrature Amplitude Modulation) and CAP (carrierless Amplitude and Phase modulation). QAM/CAP: The signal can be shifted in frequency, using a carrier. This doubles the system bandwidth, but it also allows the use of two orthogonal carriers so that two separate streams can be transmitted in the same bandwidth. QAM uses sine and cosine waves as the two carriers. This can be viewed as the two pulse amplitudes being carried on one complex carrier. It is usual to suppress the carrier and then encode the QAM pulse amplitudes differentially. In the CAP scheme the 'complex carrier' is based on a Hilbert transform pair -but results in a similar transmission spectrum.

DMT: DMT divides the entire signal band into many sub-channels, spaced about 4.3125 KHz apart. The total data are carried by the multiple sub-channels or carriers (also known as tones). For each sub-channel, QAM is used to modulate the data onto the individual carrier. Thus, DMT can be considered as a large number (many 100's) of independent QAM systems operating on carriers that are closely packed. The carriers are multiples of a fundamental frequency such that the QAM channels are truly orthogonal (independent). Thus, tones can be turned on or off as necessary in order give the best overall system performance and spectral shaping in order to reduce interference.

In the time domain, the signal appears as a series of adjoining periods. In each period, every tone in use produces a tone burst which lasts for the period. Each tone burst is modulated with a complex number (i.e., two signals). The resulting time domain signal is the sum of all of these modulated tone bursts and will appear almost like a noise waveform.

The following comments explain why a broadband signal can be regarded as an analogue signal despite the fact that digital information is contained within it.

To see the digital nature of a broadband signal, one has to switch to the frequency domain, where the finite number of phase and amplitude states of the QAM carriers which are superposed to create the DMT signal becomes apparent. In the time domain, essentially the broadband signal has the appearance of a noise signal, with no visible quantisation structure: that is, the signal can take a substantially continuous range of values. It has an amplitude distribution function which is a near perfect Gaussian, although practical realisations limit the peak-to-RMS ratio to approximately 5.

Essentially, a broadband signal can be viewed as a superposition of a plurality of tones, for example quadrature amplitude modulated signals (quadrature amplitude modulation is a modulation scheme which conveys data by changing the amplitude of two carrier waves. These two carriers, usually sinusoids with the same frequency, are out of phase with each other by 90 degrees).

Each carrier will carry a few bits up to 15 bits per carrier. For example, 10 bits corresponds to 1024 different states (using both amplitude levels and phase values, e.g. 32 amplitudes and 32 different phase values). 15 bits gives 32768 different states, 4 bits only have 16 states etc. For each carrier, it can be in one of its possible states, so if we look at two carriers both having 10 bits/tone, the combination of their different states is 1024×1024, for DMT we have many 100's of the tones, thus for the total DMT signal, combination of the different states are almost countless.

The invention claimed is:

1. A method of delivering broadband signals over an optical link for subsequent transport over a telephony connection, the telephony connection having a constraint profile associated therewith according to which a maximum allowed power of transmitted broadband signals is specified as a function of frequency, the constraint profile having a first spectral region and as a second spectral region within the frequency range of the broadband signals, the specified power level in the second spectral region being, at least on average, lower than that in the first spectral region, the method comprising:

performing pre-emphasis on the broadband signals such that the amplitude of the signals in the second region is increased relative to the amplitude of the broadband signals in the first region, thereby causing the level of at least some of the signals to exceed that specified by the constraint profile;

subsequently transmitting the signals over the optical link;

performing de-emphasis on the broadband signals after the broadband signals have been transmitted over the link so as to reverse the previously performed pre-emphasis and return the signals to levels within those specified by the constraint profile; and after de-emphasis has been performed, launching the broadband signals onto the telephony connection, wherein the broadband signals are analogue signals, and wherein the analogue broadband signals are subjected to an analogue-to-digital conversion process for transmission over the link before being converted back into analogue signals by a digital-to-analogue conversion process after transmission over the link.

2. A method as claimed in claim 1, wherein the telephony connection is an electrical twisted pair connection.

3. A method as claimed in claim 1, wherein the analogue-to-digital conversion process is a low resolution process having $10^{12}$ or less.

4. A method as claimed in claim 1, wherein the conversion processes introduce noise onto the signal, which noise is constant to within at least 50% over a spectral range that includes the first and second spectral ranges.

5. A method as claimed in claim 1, wherein the level of at least some of the signals in the second region are caused to exceed that specified by the constraint profile.

6. A communication system for delivering broadband signals to a telephony connection such that the broadband signals can subsequently be transmitted over the telephony connection, comprising:

a modulator arrangement for modulating signals such that the modulated signals are broadband signals suitable for transmission over the telephony connection, the modulator arrangement having a memory associated therewith which stores in use a constraint profile specifying the maximum allowed power level of signals as a function of frequency, the constraint profile having a first spectral region and a second spectral region within the frequency range of the broadband signals, the specified power level in the second spectral region being, at least on average, lower than that in the first spectral region, the modulator arrangement being arranged to shape the broadband signals in the frequency domain so that the signals are within the power level specified by the constraint profile;

a pre-emphasis stage arranged in use to receive the broadband signals and perform pre-emphasis on the broadband signals such that the amplitude of the signals in the second region is increased relative to the amplitude of the broadband signals in the first region, thereby causing the level of at least some of the signals to exceed that specified by the constraint profile; and a de-emphasis stage arranged in use to reverse the pre-emphasis applied to the broadband signal by the pre-emphasis stage, such that the broadband signals are returned to levels within those specified by the constraint profile of the modulator arrangement, wherein the broadband signals are analogue signals, and wherein the analogue broadband signals are subjected to an analogue-to-digital conversion process for transmission over the link before being converted back into analogue signals by a digital-to-analogue conversion process after transmission over the link.

7. A communication system as claimed in claim 6, wherein the memory has a plurality of constraint curves stored therein, and wherein the modulator arrangement has input means for selecting a constraint curve according to which signals from the modulator arrangement are constrained.

8. A communication system as claimed in claim 6, including an optical extension link arranged to carry in use signals between the pre-emphasis stage and the de-emphasis stage.

9. A communication system as claimed in claim 6, including launch means disposed so as to launch signals from the de-emphasis stage onto the electrical connection.

10. A communication system as claimed in claim 9, wherein means for are provided for superposing the signals from the de-emphasis stage onto the telephony signals.

11. A communication system as claimed in claim 10, wherein the signals from the de-emphasis stage are superposed in the frequency domain.

12. A communication system as claimed in claim 6, wherein the telephony connection is a twisted pair connection.

13. A communication system as claimed in claim 6, wherein the telephony connection has a maximum allowed power level of signal as a function of frequency associated therewith, the maximum allowed power level of signal as a function of frequency being specified by the constraint profile of the modulator.

14. A method of delivering broadband signals over an optical link for subsequent transport over a telephony connection, the method comprising:
    performing pre-emphasis on the broadband signals;
    converting the broadband signals from the electrical domain into the optical domain;
    transmitting the converted broadband signals over the optical link;
    after transmission over an optical link, converting the broadband signals from the optical domain back into the electrical domain;
    performing de-emphasis on the transmitted broadband signals; and
    transmitting the de-emphasised signals onto the telephony connection, wherein
    the broadband signals are analogue signals, and wherein the analogue broadband signals are subjected to an analogue-to-digital conversion process for transmission over the link before being converted back into analogue signals by a digital-to-analogue conversion process after transmission over the link.

15. A method as claimed in claim 14, wherein converting the broadband signals from the electrical domain into the optical domain and converting the broadband signals from the optical domain back into the electrical domain are carried out using a conversion process having a noise level associated therewith in a given spectral region, and wherein the pre-emphasis has the effect of increasing the broadband signals relative to the noise floor in the given spectral region, and the de-emphasis has the effect of decreasing the both the broadband signal and the noise level in the given spectral region.

16. A method of transmitting broadband signals onto to a telephony connection, the telephony connection having a constraint profile associated therewith according to which a maximum allowed power of transmitted broadband signals is specified as a function of frequency, the constraint profile having a first spectral region and a second spectral region within the frequency range of the broadband signals, the specified power level in the second spectral region being, at least on average, lower than that in the first spectral region, the method comprising:
    performing pre-emphasis on the broadband signals such that the amplitude of the signals in the second region is increased relative to the amplitude of the broadband signals in the first region, thereby causing the level of at least some of the signals to exceed that specified by the constraint profile;
    subsequently transmitting the signals over an optical link;
    performing de-emphasis on the broadband signals after the broadband signals have been transmitted over the optical link so as to reverse the previously performed pre-emphasis and return the signals to levels within those specified by the constraint profile; and
    after de-emphasis has been performed, launching the broadband signals onto the telephony connection, wherein
    the broadband signals are analogue signals, and wherein the analogue broadband signals are subjected to an analogue-to-digital conversion process for transmission over the link before being converted back into analogue signals by a digital-to-analogue conversion process after transmission over the link.

17. A communication system for carrying broadband signals over a telephony connection, comprising:
    a modulator arrangement for modulating signals such that the modulated signals are broadband signals suitable for transmission over the telephony connection, the modulator arrangement having a memory associated therewith which stores in use as constraint profile specifying the maximum allowed power level of signals as a function of frequency, the constraint profile having a first spectral region and a second spectral region within the frequency range of the broadband signals, the specified power level in the second spectral region being, at least on average, lower than that in the first spectral region, the modulator arrangement being arranged to shape the broadband signals in the frequency domain so that the signals are within the power level specified by the constraint profile;
    a pre-emphasis stage arranged in use to receive the broadband signals and perform pre-emphasis on the broadband signals such that the amplitude of the signals in the second region is increased relative to the amplitude of the broadband signals in the first region, thereby causing the level of at least some of the signals to exceed that specified by the constraint profile; and
    a de-emphasis stage arranged in use to reverse the pre-emphasis applied to the broadband signal by the pre-emphasis stage, such that the broadband signals are returned to levels within those specified by the constraint profile of the modulator arrangement, wherein
    the broadband signals are analogue signals, and wherein the analogue broadband signals are subjected to an analogue-to-digital conversion process for transmission over the link before being converted back into analogue signals by a digital-to-analogue conversion process after transmission over the link.

* * * * *

UNITED STATES PATENT AND TRADEMARK OFFICE
CERTIFICATE OF CORRECTION

| | | |
|---|---|---|
| PATENT NO. | : 8,582,976 B2 | Page 1 of 1 |
| APPLICATION NO. | : 12/681451 | |
| DATED | : November 12, 2013 | |
| INVENTOR(S) | : Boyd | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 745 days.

Signed and Sealed this
Seventh Day of April, 2015

Michelle K. Lee
*Director of the United States Patent and Trademark Office*